(12) United States Patent
Lorenz-Börnert

(10) Patent No.: US 6,976,500 B2
(45) Date of Patent: Dec. 20, 2005

(54) VALVE COMBINATION FOR A FLUID CIRCUIT WITH TWO PRESSURE LEVELS, PARTICULARLY A COMBINED COOLING SYSTEM/HEAT PUMP CIRCUIT

(75) Inventor: Marion Lorenz-Börnert, Bergisch-Gladbach (DE)

(73) Assignee: Visteon Global Technologies, Inc., Van Buren Township, MI (US)

( * ) Notice: Subject to any disclaimer, the term of this patent is extended or adjusted under 35 U.S.C. 154(b) by 66 days.

(21) Appl. No.: 10/319,264

(22) Filed: Dec. 13, 2002

(65) Prior Publication Data

US 2003/0131883 A1    Jul. 17, 2003

(30) Foreign Application Priority Data

Dec. 17, 2001  (DE) .............................. 101 62 785

(51) Int. Cl.[7] .............................................. F25B 41/04
(52) U.S. Cl. ............ 137/106; 137/596.16; 137/599.11; 137/625.43
(58) Field of Search ........................... 137/106, 599.11, 137/596.16, 625.43

(56) References Cited

U.S. PATENT DOCUMENTS

| | | | |
|---|---|---|---|
| 2,888,039 A | | 5/1959 | Tilney |
| 2,982,303 A | * | 5/1961 | Wiegers ..................... 137/106 |
| 3,039,491 A | * | 6/1962 | Raney ........................ 137/106 |
| 3,293,880 A | | 12/1966 | Greenawalt |
| 3,527,255 A | * | 9/1970 | Greenawalt ............ 137/625.29 |
| 3,650,287 A | * | 3/1972 | Greenawalt ................. 137/106 |
| 3,980,001 A | * | 9/1976 | Cyphelly .................... 137/106 |
| 6,295,828 B1 | | 10/2001 | Koo |

FOREIGN PATENT DOCUMENTS

| | | |
|---|---|---|
| EP | 1061314 | 12/2000 |
| GB | 815 622 A | 7/1959 |
| GB | 966 836 A | 8/1964 |
| WO | 88/04745 | 9/1987 |

* cited by examiner

Primary Examiner—Stephen M. Hepperle
(74) Attorney, Agent, or Firm—Brinks Hofer Gilson & Lione

(57) ABSTRACT

The invention relates to a valve combination which is characterized in that the valve combination has a passive valve and an active valve. The active valve is provided with means for an active influence of the control position of a closing element and regulates the fluid flow at a high pressure. The passive valve controls the fluid flow at low pressure. The passive valve and the active valve are integrated into the cooling system pump circuit such that the pressure difference between the high and low fluid pressure and the control positions of the active valve determine the control position of the passive valve.

23 Claims, 9 Drawing Sheets

VALVE COMBINATION FOR A FLUID CIRCUIT WITH TWO PRESSURE LEVELS, PARTICULARLY A COMBINED COOLING SYSTEM/HEAT PUMP CIRCUIT

TECHNICAL FIELD OF THE INVENTION

The invention relates to an improved fluid circuit with two pressures levels, particularly a combined cooling and heating circuit for motor vehicles.

BACKGROUND OF THE INVENTION

Directional valves are used in fluid circuits when the flows have to be divided or combined or, in different operational conditions, different branches of the fluid circuit are passed and other branches are excluded from passage or isolated.

Special requirements of the high-pressure and low-pressure resistance of such valves result for fluid circuits with difference pressure levels. An example of such a circuit is a combined cooling system/heat pump circuit, where, for example, with carbon dioxide as coolant, in one operational condition the coolant circuit is switched to act as cooling plant and in another operational condition the coolant, circuit is switched to act as heat pump. Dependent on the control state the coolant passes different branches of this coolant circuit with different pressure levels.

To make possible this multifunctionality of a coolant circuit for the above-mentioned cooling system and heat pump operational states, it is necessary to integrate directional valves into the coolant circuit. Such a directional valve is the sorting gate for the coolant flow, deciding whether the circuit is operated as cooling system or as heat pump.

In such known circuits a directional valve is positioned downstream of the compressor of the cooling system, which means that the directional valve must withstand the high-pressure and temperature levels of the coolant. Therefore special requirements of the pressure and temperature resistance of such a directional valve must be imposed. To close the circuit mentioned as an example also as a heat pump, another directional valve is required so that, after having passed the circuit, the coolant flows can be re-supplied to those components that are passed in both the heat pump and cooling plant operational modes.

In the state-of-the art WO 88/04745 a directional valve is disclosed that functions also at high temperatures and high fluid pressure. In this valve the high-pressure flow is directed within the valve body into different circuit branches dependent on the control position of a control element. The control position of the control element is controlled by a low-pressure control system with a spool and connected valve stems.

This directional valve is sealed to the outside by seals arranged around the valve stem. The control position of the valve and hence the function of the refrigerant circuit is determined by the low-pressure control system. To this end pressure is applied to the low-pressure control cylinder. The corresponding pressurized low-pressure control cylinder moves the spool, which is connected to the valve stem and the control element. On arrival at the control position, the control element opens a path for the refrigerant, and another path is closed.

It is a particular disadvantage of this system that an additional fluid system is required, namely the low-pressure control system for the movement of the control element to the control positions of the directional valve. The additional low-pressure control system further involves leakage points and hence sources of error of the total system. In addition, no rest position of the control element is defined. That means that in case of breakdown of the low-pressure control system the entire system breaks down, because the fluid circuit is not operable without the directional valve.

Further, in the state-of-the-art a directional valve is known by EP 1061314, which can be used for a combined cooling system/heat pump circuit.

SUMMARY OF THE INVENTION

In describing the invention, details relating to "directional valves" are presented by a fraction such as 4/2, 5/2, 3/2. In such use of the fraction, the numerator designates the number of the orifices in the valve and the denominator designates the number of valve stems.

The subject matter of this patent is a 4/2 directional valve with valve elements that are designed as hollow cylinders. No design of a control or closing body is provided as defined by this document. Instead of the closing body, cylindrical hollow elements are moved against spring-loaded sealing plates. These sealing plates close the flow path through the hollow cylinder dependent on the position of the hollow elements. Thus the different paths are controlled by the position of the cylindrical elements. Dependent on the position different fluid flow paths are opened in the housing, which eventually makes a 4/2-passages possible.

Control of the cylindrical hollow elements is through a solenoid-operated valve. In the case of the directional valve in EP 1061314, the movement of the hollow cylinder valve is produced by a second fluid circuit, which is controlled by an electromagnetically actuated control piston. This control piston creates high pressure, which moves the hollow cylinder valve element into a certain control position and hence allows passage of the directional valve through two separate fluid paths.

Also this design to the state-of-the-art is characterized by the fact that the functions of the combination of a cooling plant and heat pump in a refrigerant circuit are performed very expensively through several means or auxiliary circuits and a great number of surfaces to be sealed. The disadvantages of those directional valve lies in the complicated design, too heavy weight and great number of single components at high prices.

Furthermore, due to the electromagnetic actuation of the valves the costs of the isolation classes increase, because the solenoids heat up when operated. This effect should be kept as little as possible, because a heat quantity additionally input in cooling plant operation, e.g., results in a reduced efficiency. In order to counteract the heating of the solenoids, they are generally designed with larger dimensions. This, on the other hand, counteracts the efforts to use small components and have low costs.

Other directional valves, which are actuated using stepping motors, can only difficultly be sealed. This is a special problem for circuits with a high-pressure refrigerant such as carbon dioxide.

Altogether, the costs of solenoid valves as directional valves for refrigerant circuits according to the preamble of the invention are still very high.

It is the objective of this invention to achieve a simple and robust design of a valve combination, which is suitable to be used in refrigerant circuits with partly very high pressures.

According to the invention this problem is solved by the valve combination is composed of a passive valve and an active valve, whereby the active valve is provided with means for an active influence of the control position of a closing element and regulates the fluid flow at a high pressure and the passive valve controls the fluid flow at a low pressure and these valves are integrated into the cooling system/heat pump circuit such that the pressure difference between the high and low fluid pressure and the control position A, B of the active valve determine the control position of the passive valve. Within the valve combination, however, the passive and the active valves can be designed as separate components but the design of the valve combination according to the invention as a structural and compact unit is especially advantageous.

Additional benefits and advantages of the present invention will become apparent to those skilled in the art to which this invention relates from the subsequent description of the preferred embodiment and the appended claims, taken in conjunction with the accompanying drawings.

DETAILED DESCRIPTION OF THE PREFERRED EMBODIMENT

Figure 1:
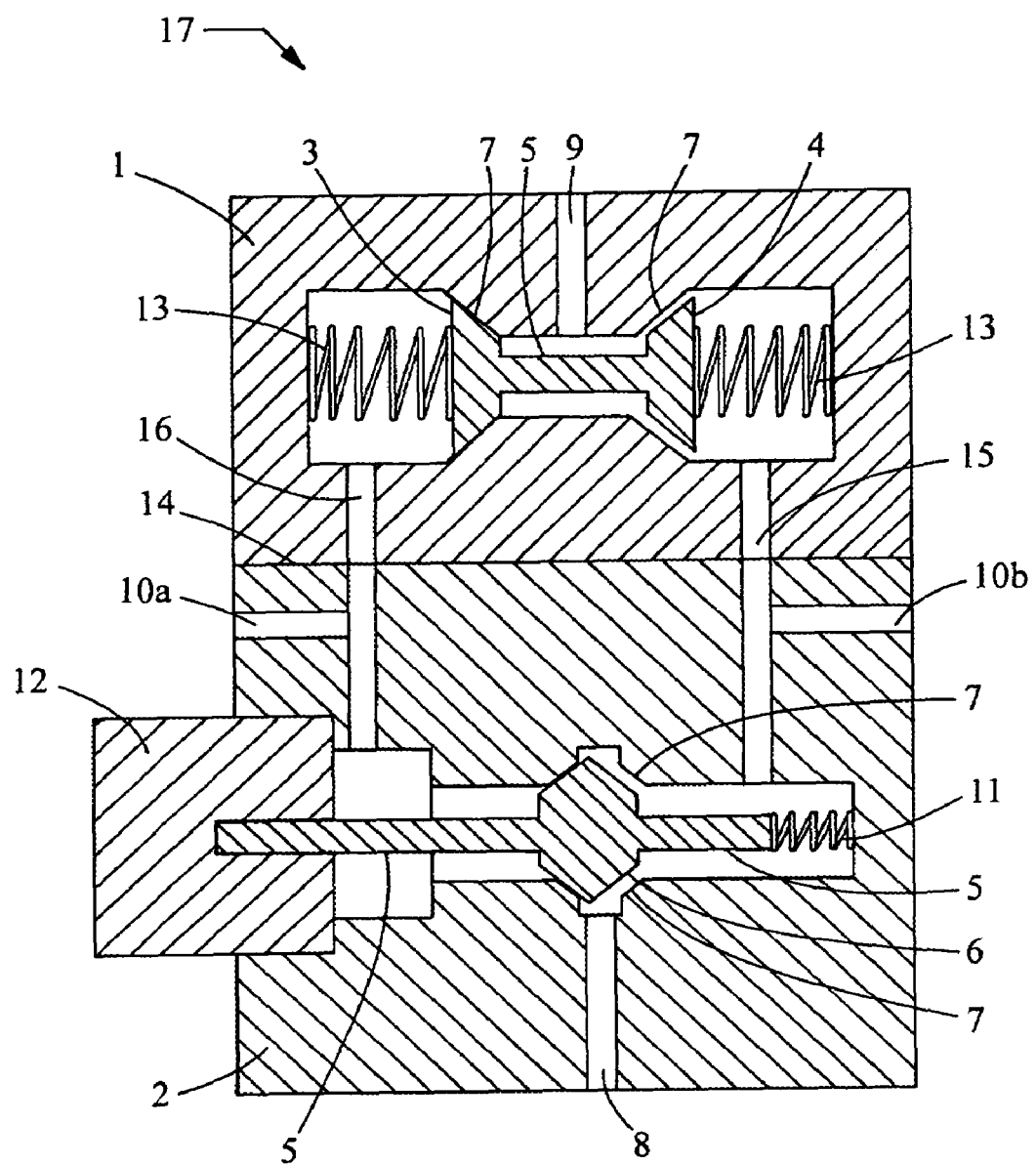
FIG. 1 shows ½ directional valve in cooling system operation in control position A.

In FIG. 1 according to a first preferred embodiment of the invention a directional valve 17 is shown which is composed of two functional components and includes a passive valve 1 and an active valve 2. The active valve 2 is provided with means for an active influence on the control position of a closing body 6 and regulates the high-pressure fluid flow. The passive valve 1 regulates the low-pressure fluid flow.

Both components of the directional valve, the passive valve 1 and the active valve 2, are connected with each other by the channels 15, 16. The control position of the active valve 2 and the pressure difference between high and low pressure in the circuit define the control position of the passive valve 1.

The passive valve 1 has two control positions and a rest position in between. This rest position is automatically taken for balanced pressure difference, independent of the control position of the active valve 2. Preferably, the passive valve 1 has two closing bodies 3, 4 which are connected with each other by a valve stem 5. Each closing body 3, 4 is connected to a spring element 13. The two spring elements affect the position of the closing bodies 3, 4 connected with each other in such a way that for balanced pressure difference in the fluid circuit the closing bodies take a central rest position. In this position both flow paths are closed by the fit of the closing bodies 3, 4. Not the tightness of the seal, however, is important but the increase of the flow resistance for the fluid circuit, as only then tightness of the sealing surfaces develops due to the pressure built-up at the start of the compression.

According to this preferred embodiment the passive valve 1 is designed completely symmetric and has no additional actuator for the movement of the closing bodies 3, 4.

Further the closing bodies 3, 4 of the passive valve 1 have sealing surfaces 7, which face each other and to which opposite corresponding surfaces in the passive valve body are assigned.

The active valve 2 has a closing body 5 with a valve stem 5 each on either side of the closing body 6. One side of the valve stem 5 is connected to a spring element 11, which holds the closing body 6 in a first control position A, while the other side of the valve stem 5 is connected to a solenoid control 12 which when activated moves the closing body against the spring force of the spring element 11 into a second control position B, according to FIG. 2. The spring element 11 is dimensioned such that after the activation of the solenoid control 12 the closing body 6 of the active valve 2 is held in the control position B also after switch-off of the solenoid control 12 owing to the pressure difference of the fluid flows.

Movement of the closing body 6 of the active valve 2 can advantageously be reached electromagnetically. This allows to encapsulate the component and particularly high refrigerant pressures can be easily governed. Sealing between the solenoid control 12 and the valve body of the active valve 12 is preferably reached by welding or bonding. Also metallic seals can be used as detachable connections. One valve seat of the closing body 6 is integrated directly in the solenoid control 12 and the other valve seat is integrated directly in the body of the active valve 2 so that a very short construction length of the active valve 2 can be obtained. Due to the metallically sealed design of the solenoid tube or the solenoid control 12, respectively, the directional valve 17 can be made hermetically tight.

Also advantageously designed is the actuation of the closing body 6 by means of a stepping motor.

The sealing surfaces 7 of the closing body 6 of the active valve 2 are arranged at the closing body 6 opposing from each other. Again corresponding surfaces in the active valve body are arranged opposite to the sealing surfaces 7.

In another embodiment of the invention the spring elements 11, 13 can be adapted to various fluid pressure differences by regulation of the spring forces.

Particularly preferred, there is an insulating layer 14 between the passive valve 1 and the active valve 2, in order to thermally separate both valves from each other.

In principle, any control arrangement of the active valve 2 is possible. Preferably, in cooling system operational mode the active valve 2 functions in control position A and in heat pump operational mode in control position B.

Figure 3:
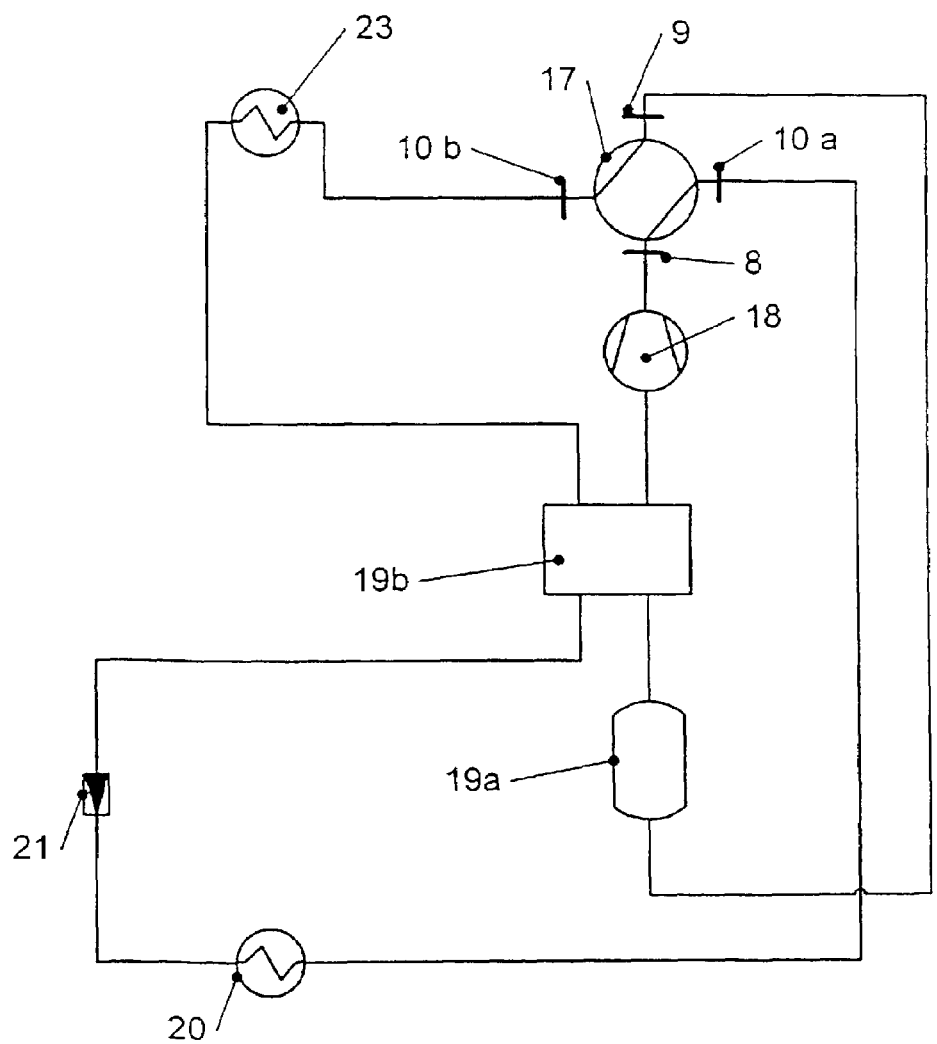
FIG. 3 shows the heat pump mode of the refrigerant circuit with the outside air as the heat source.

In the following, referring to FIG. 3, the heat pump operational mode of the combined cooling system/heat pump using the outside air is described. The ½-directional valve 17 according to the invention, referring to FIG. 1, is connected through its port 8 to the compressor 18 of the refrigerant circuit. The refrigerant system is at balanced pressure. The compressor 18 does not work. Therefore the closing bodies 3, 4 of the passive valve 1 are in rest position.

The active valve 2 of the directional valve 18 is activated by the solenoid control 12. Hence the closing body 6 moves into the control position B, FIG. 1, on the right side of the active valve 2.

After switch-in of the heat pump operational mode the compressor 19 (FIG. 3) compresses the refrigerant vapor to a higher pressure. The compressed refrigerant passes the active valve 2 through the port 8, the high-pressure port of the directional valve 17 in direction of the compressor 18, then passes the channel 16 and leaves the directional valve 18 through the outlet 10a at a high pressure. The refrigerant vapor then flows into the interior heat exchanger 20, where it delivers its hear energy to heat the vehicle compartment.

Now, after the expansion in the expansion element 21 and heat transfer in the interior heat exchanges 19a, the refrigerant is led into the exterior heat exchanger 23 of the heat pump circuit. Then the expanded refrigerant flows into the passive valve 1, of the directional valve 17 at inlet 10b. The vaporous refrigerant flows through channel 15 into the passive valve 1 of the heat directional valve 17 to the low-pressure outlet 9 and then to the collector 19a and interior heat exchanger 19b and to the compressor 18.

In this operational mode, the closing bodies 3, 4 of the passive valve 1 are displaced. Due to the high pressure of the refrigerant in channel 16 the closing body 3 closes the passive valve 1 for the high-pressure refrigerant flow, and the low-pressure refrigerant flow, coming from the inlet 10b at low pressure through channel 15 passing the closing body 4 into the low-pressure outlet 9 to the collector 19a and interior heat exchanger 19b can close the circuit in direction of the compressor 18.

In the heat pump operational mode, due to the activated solenoid control 12 the closing body 6 is moved against the spring force of the spring element 11 into the control position B. After switch-in of the compressor 18 the built-up high pressure of the refrigerant and the resulting pressure force on the closing body 6 also support the control position B taken, if the solenoid control 12 is switched off. Thus results advantageously in that the closing body 6 is held in this control position. Therefore, the solenoid control can advantageously be dimensioned for short-time service.

This means that the solenoid control 12 feeds less heat energy in the refrigerant circuit and the solenoid can have smaller dimensions. Therefore costs and space requirements of this components are reduced.

For deactivated solenoid control 12 and essentially balanced pressure (pressure difference smaller than 5 bar) the closing body 6 returns into its control position A (FIG. 1) due to the spring force of the spring element 11.

Because the active valve 2 cannot be switched over in any short time due to necessary pressure balancing, sufficient time for the return of the passive valve 1 is always available. The change of the control position of the active valve 2 from B to A is only possible after the pressure difference has been relieved to a great extent.

In a preferred embodiment of the invention the closing bodies 3, 4 and the valve stem 5 of the passive valve 1 are made in five parts for assembly reasons, whereby the valve seats in the passive valve 1 are made of PTFE- or EPDM compound or other $CO_2$ resistant sealing materials.

The inside seals of the passive valve 1 and the active valve 2, the sealing surfaces 7, are made as seals, using PTFE, for example, or other sealing materials against metal. Thereby the sealing materials are preferably located on the closing bodies 3, 4, 6. This enables a cost-efficient, relatively low-expensive machining of the housing seat surfaces. Therefore no high requirements of the housing material are established so that aluminum can be used.

Figure 4:
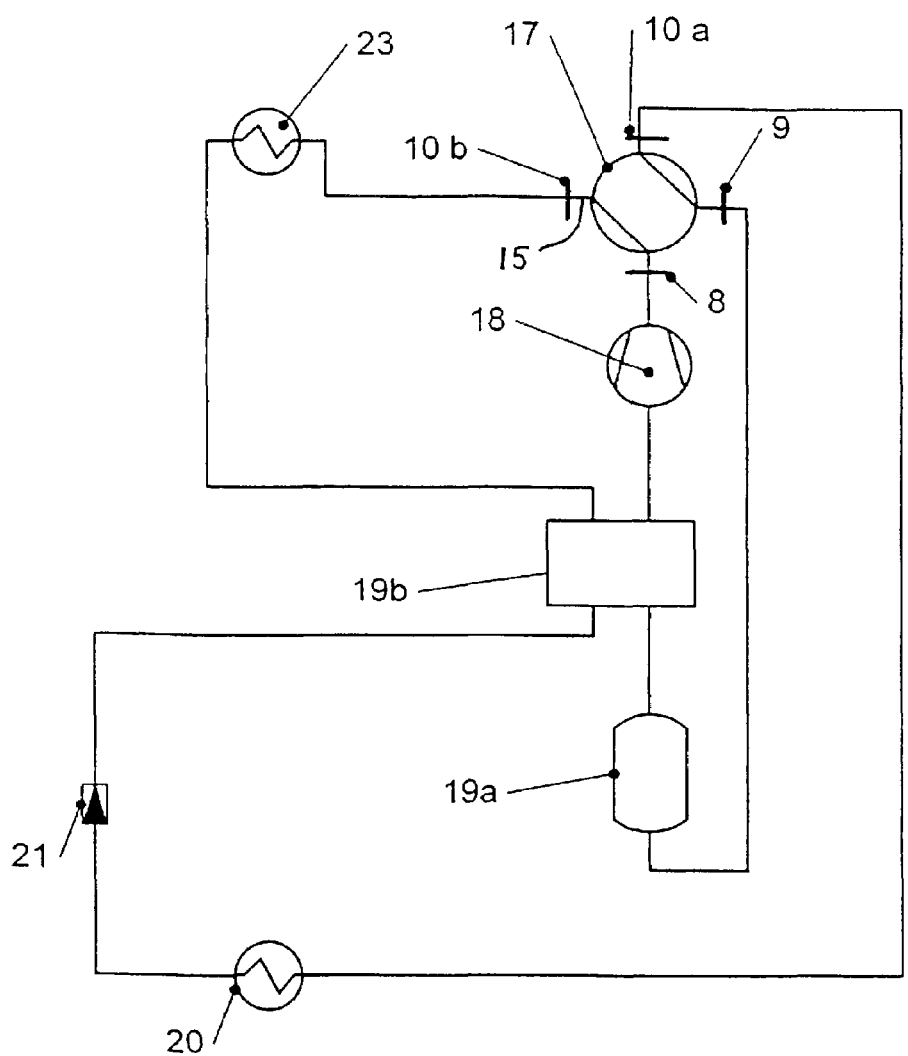
FIG. 4 shows cooling system mode of the refrigerant circuit with the outside air as the heat source.

In cooling plant operational mode of the refrigerant circuit, with reference to FIG. 4, the refrigerant is led after the compression in the compressor 18 through the channel 15 to the outlet 10b of the active valve 2 of the directional valve 17. From there the refrigerant flows into the exterior heat exchanger 23, where the refrigerant delivers part of its heat energy to the outside air.

In this mode the active valve 2 is not activated by the solenoid control 12.

Therefore the spring element 11 pushes the closing body 6 into the control position A. After the subsequent expansion in the expansion element 21 the refrigerant is vaporized at low pressure in the interior heat exchanger 20 taking heat from the vehicle compartment. The refrigerant vapor then flows to the inlet 10a of the directional valve 17.

The high pressure of the refrigerant in channel 15 pushes the closing body 4 of the passive valve 1 into the closed position. This makes possible for the refrigerant to pass via the inlet 10a, the channel 16, passing the closing body 3, to the low-pressure outlet of the directional valve 17 in direction of the collector 19a and interior heat exchanger 19b.

The high pressure produced by the compressor supports the control position A of the closing body 6 so that a small spring force of the spring element 11 can be chosen.

Figure 2:
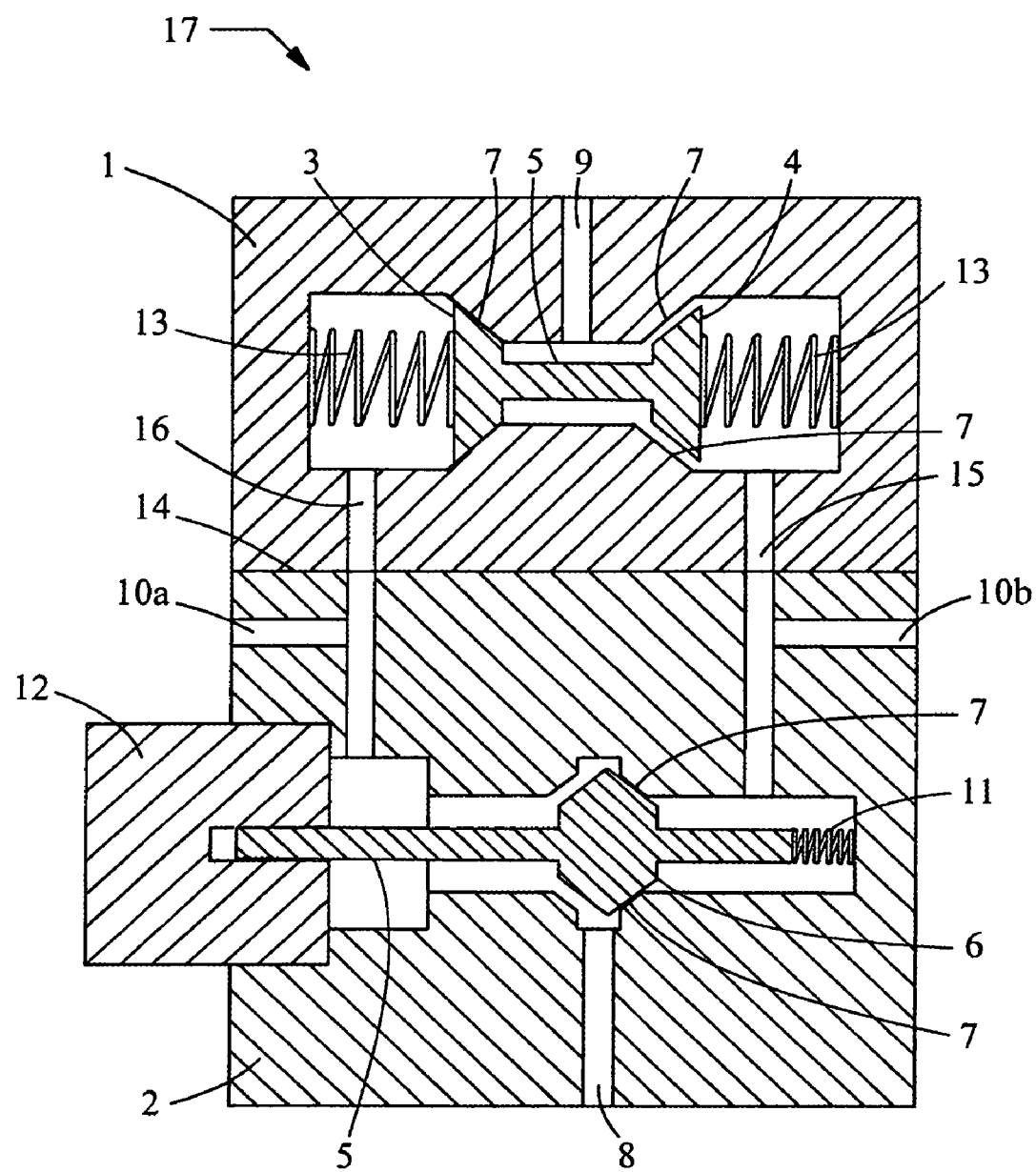
FIG. 2 shows ½ direction valve in heat pump operation in control position B.
Figure 5:
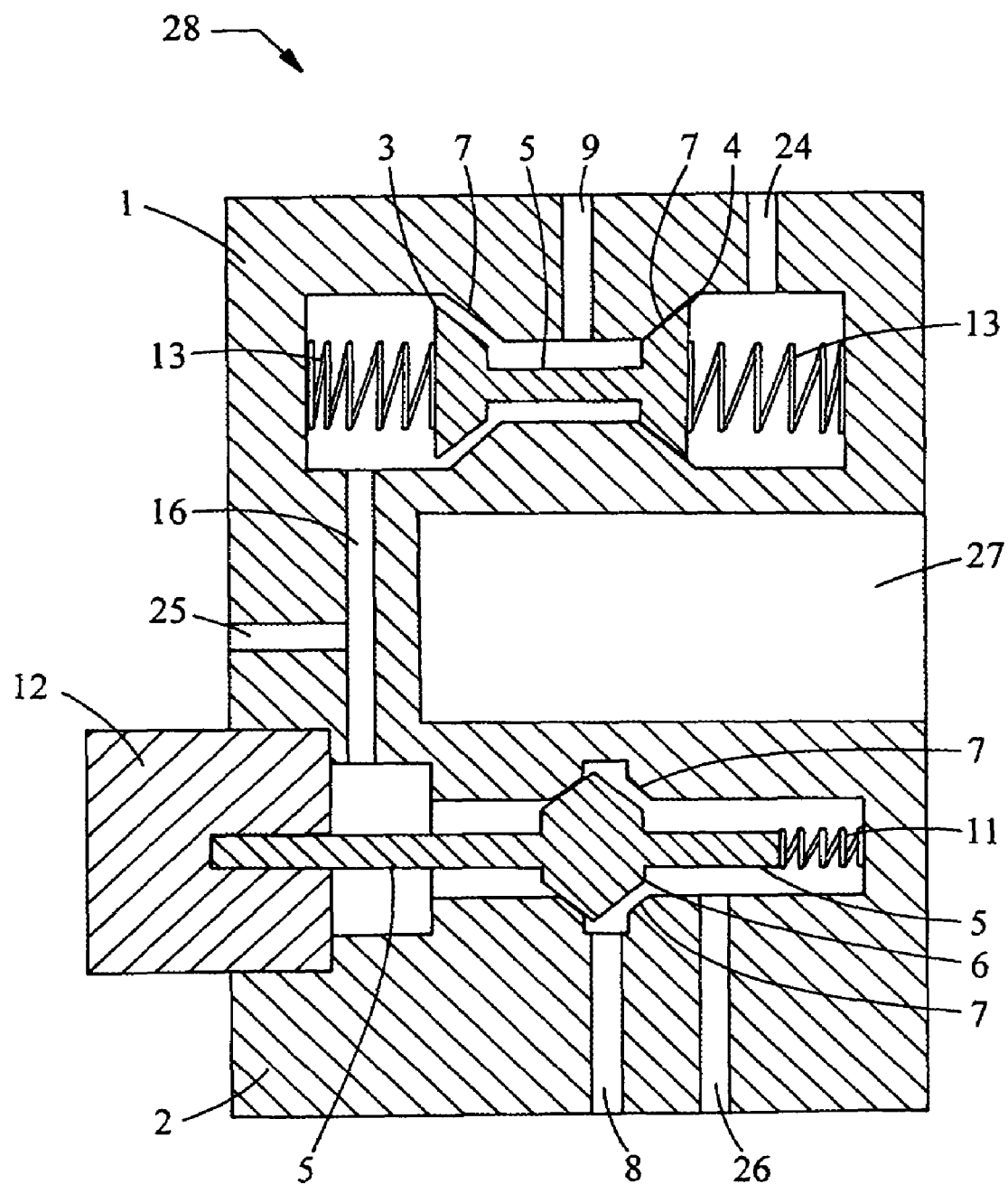
FIG. 5 shows a ⅖ directional valve in cooling system operation mode in control position A.

In an embodiment according to the invention, with reference to FIG. 5, a directional valve 28 with five ports or orifices. The 5⁄2 directional valve 28 also has both functional elements passive valve 1 and active valve 2, whereby the passive valve 1 has been provided with an additional port, compared to the 4⁄2 directional valve 17 (FIG. 1 or 2).

The passive valve 1 has a port 24 for the glycol heat exchanger and is, in known way, also provided with a port 9 directed to the collector 19a and interior heat exchanger 19b. The active valve 2 has the known port 8 for the compressor 18 and an additional port 26 for the exterior heat exchanger 23 is provided.

The passive valve 1 and active valve 2 are connected via the channel 16, from which a port 25 is directed to the interior heat exchanger 20. The thermal coupling of the active and passive valves 2,1 is reduced by a recess 27 to decrease the heat transport.

The control position A of the 5⁄2-directional valve 28, shown in FIG. 5, corresponds with the position of the closing bodies in cooling plant operational mode.

Figure 6:
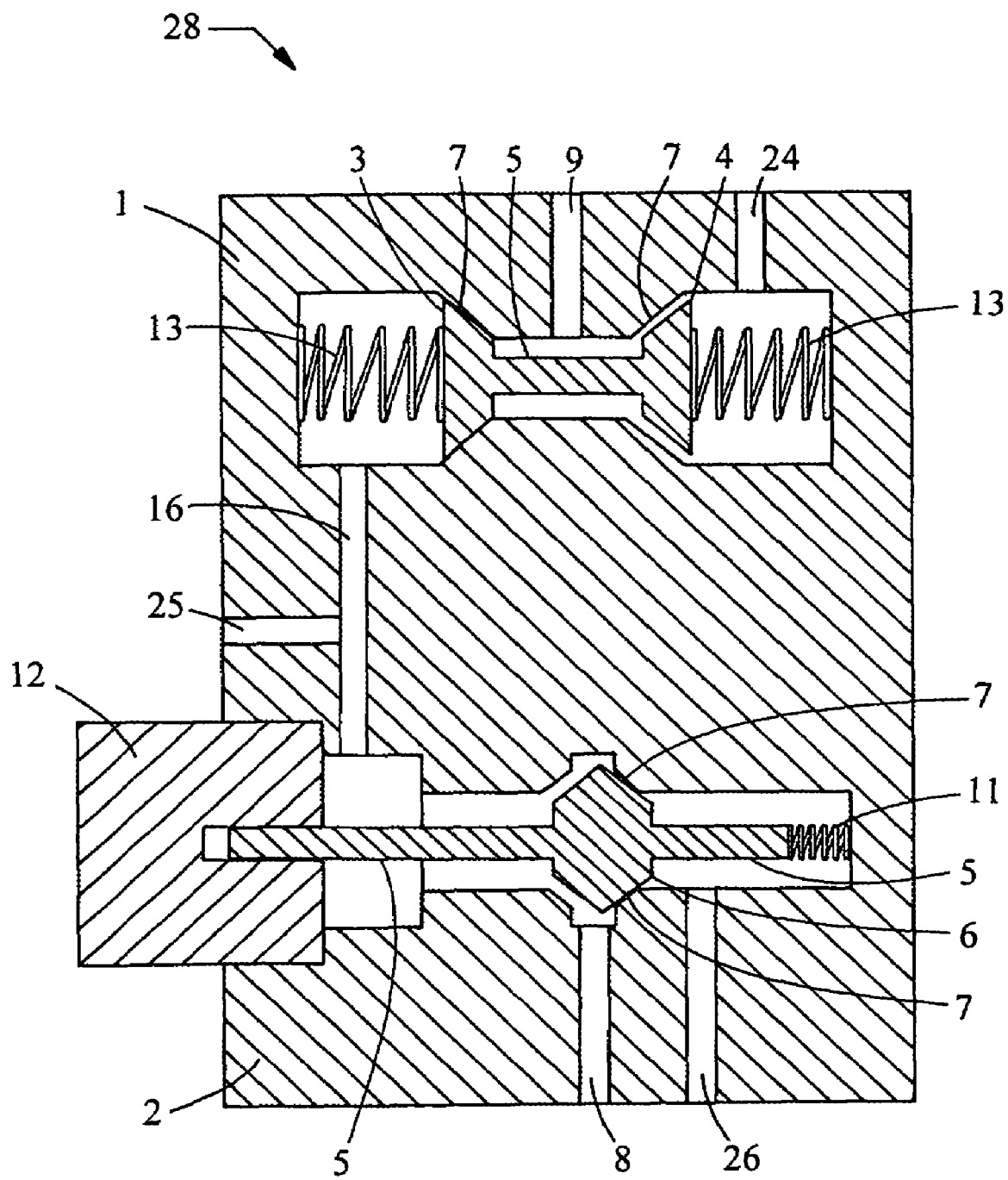
FIG. 6 shows the ⅖ directional valve in solid material design in heat pump operational mode in control position B.

In FIG. 6, the 5⁄2-directional valve is shown in the control position B of the closing bodies in heat pump operational mode. The directional valve 28 has, alternately, no recess 27 and is solidly made, for example, of a poorly heat-conducting material.

Figure 7:
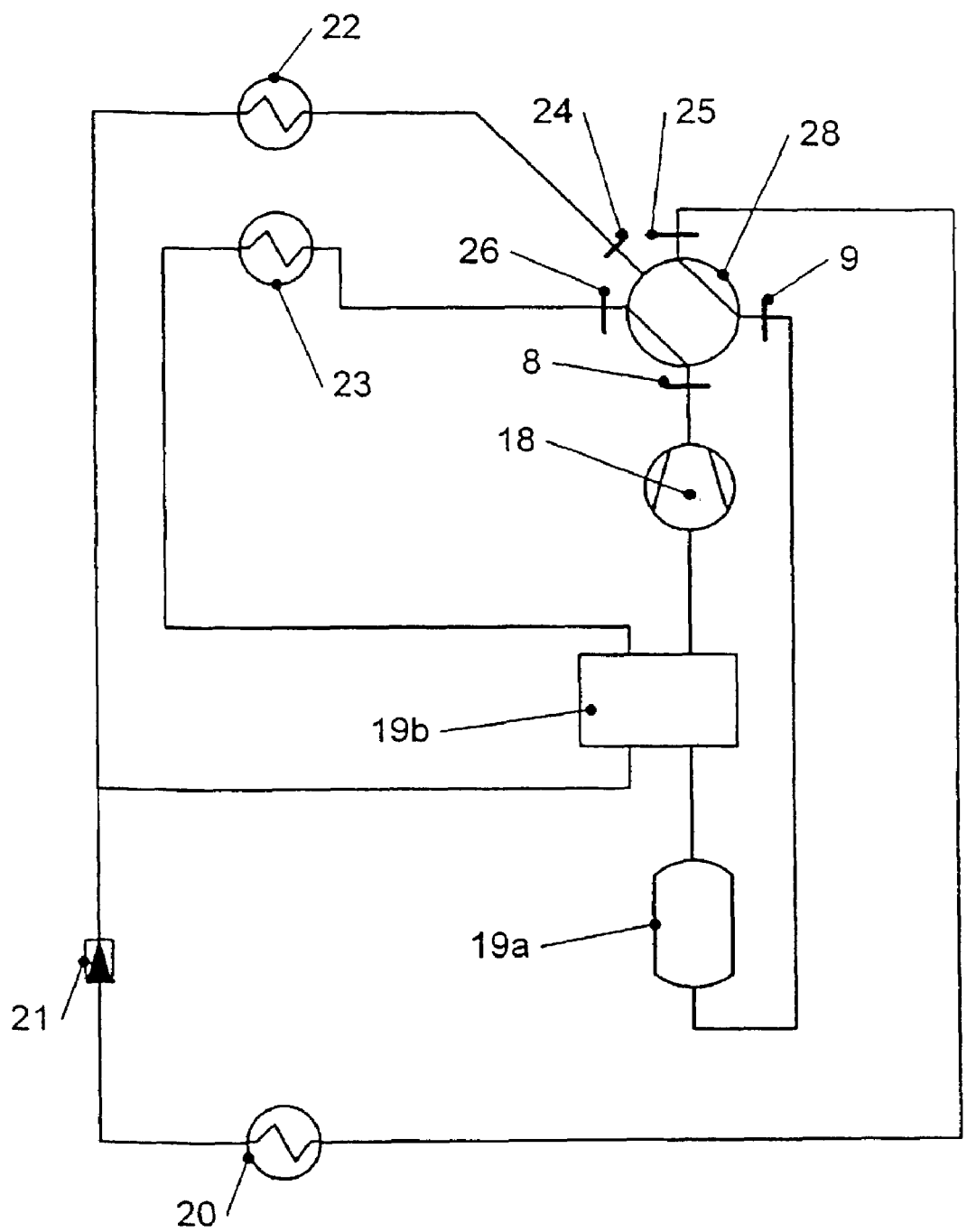
FIG. 7 shows the cooling system mode with a glycol heat exchanger.

In FIG. 7, a combined cooling system/heat pump circuit is shown as a process diagram. The position of the directional valve 28 allows the cooling system operational mode of the device. The refrigerant is compressed in the compressor 18, flows over the high-pressure port 8 of the directional valve 28 to the port 26 and then into the exterior heat exchanger 23, where it delivers energy to the environment.

Then, the refrigerant passes the interior heat exchanger 19b, before it expands in the element 21. The refrigerant then vaporizes taking heat from the vehicle compartment in the interior heat exchanger 20 and flows over port 25 and the 5⁄2-directional valve 28 into the collector 19a and the interior heat exchanger 19b to the compressor 18, where the circuit restarts beginning with the compression of the refrigerant vapor. In cooling system operational mode the glycol heat exchanger 22 is under high pressure, but is not passed by the circuit. According to the invention, the flow path for the refrigerant from the port 25 to the low-pressure outlet 9 is switched by the high pressure at the port 24 of the 5⁄2-directional valve and the effect of this high pressure on the closing body 4.

Figure 8:
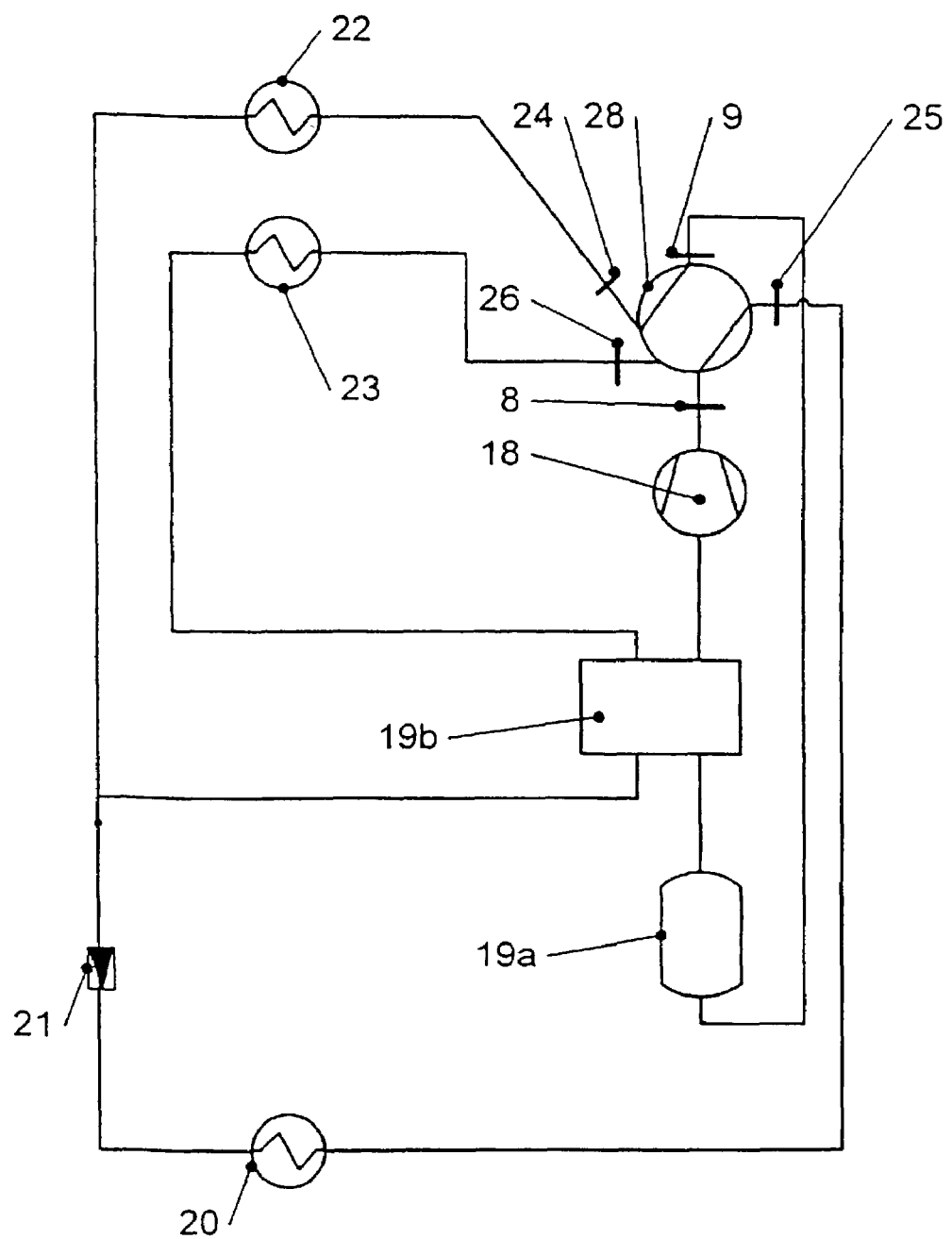
FIG. 8 shows the heat pump mode with a glycol heat exchanger.

This preferred embodiment of a 5/2-directional valve 28 according to the invention makes it possible in heat pump mode to FIG. 8 the integration of a glycol circuit of a vehicle and the utilization of this glycol circuit as a heat source for the operation of the refrigerant circuit as a heat pump.

Again, the refrigerant is compressed in the compressor 18 and flows through the high-pressure port 8 of the 5/2-directional valve 28 in control position B for the heat pump operation mode over the port 25 into the interior heat exchanger 20, where heat energy is delivered to the vehicle compartment. The refrigerant expands in the expansion element 21 and flows to the glycol heat exchanger 22, where the refrigerant vaporizes taking heat from the glycol circuit of the vehicle. Through the port 24 of the directional valve 28 and the port 9 the refrigerant vapor flows to the collector 19a and over the interior heat exchanger 19b to the compressor 18; again, the circuit of the refrigerant is closed.

The special design of the 5/2-directional valve 28 enables the integration of the glycol heat exchanger 22, whereby the exterior heat exchanger 23 and the interior heat exchanger 19b in heat pump operational mode are at a low pressure level and are not passed by the refrigerant.

Figure 9:
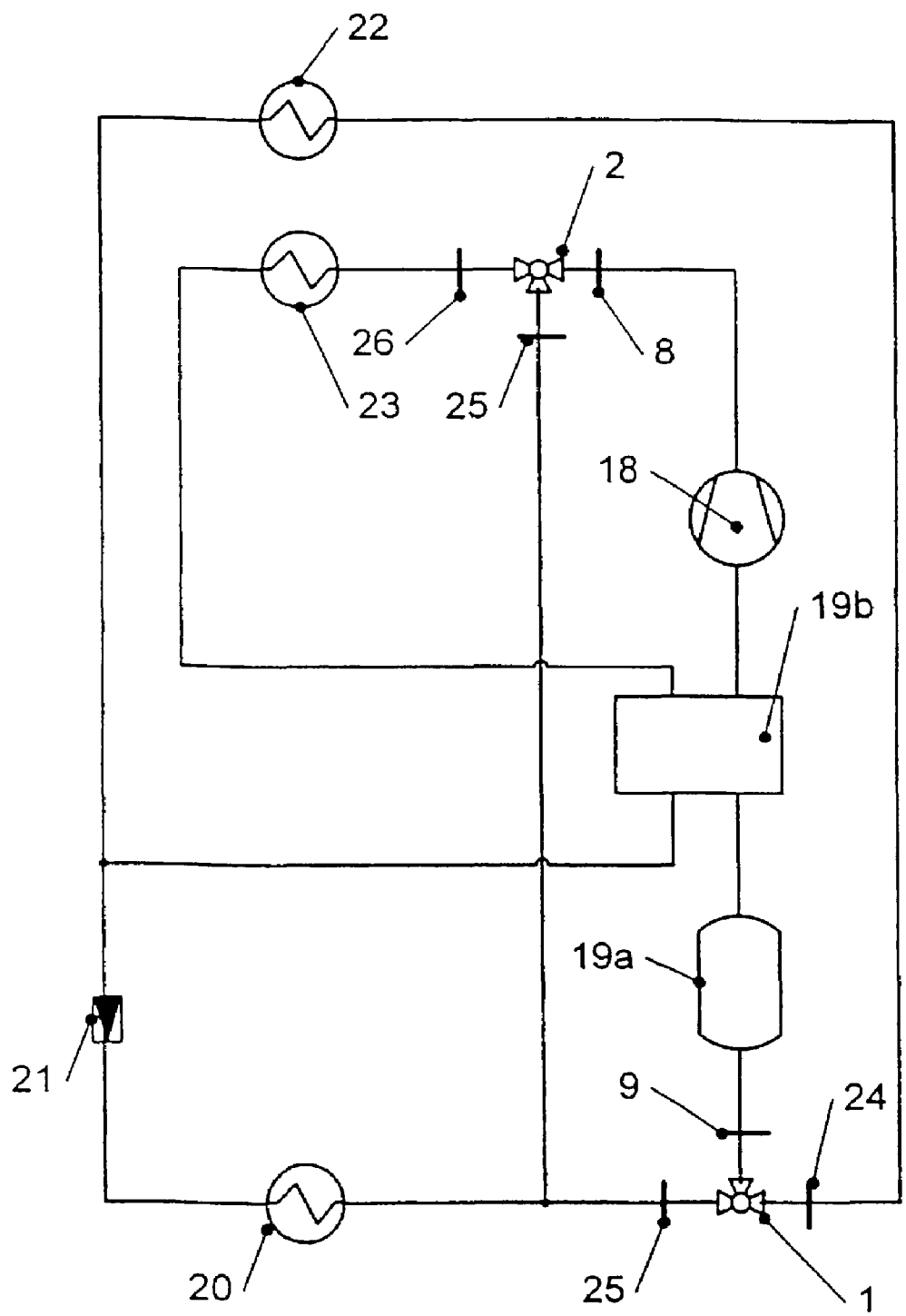
FIG. 9 shows the cooling system/heat pump mode with a glycol heat exchanger and separate ⅖ directional valves.

With reference to FIG. 9, the valve combination according to the invention is made as a constructively separated design of passive valve 1 and active valve 2. Hereby, the components passive valve 1 and active valve 2 are made as 3/2-directional valves. The cooling system/heat pump circuitry shows the active valve 2 with its ports 8, 26, and 25. In heat pump operational mode the compressed refrigerant vapor flows through port 8 to port 25 to the interior heat exchanger 20, over the expansion element 21 and the glycol heat exchanger 22 to the port 24 of the passive valve 1 and from there through the port 9, the refrigerant collector 19a and the interior heat exchanger 19b to the compressor 18.

The flow path in the passive valve 1 is switched by the high pressure at the port 25.

For cooling system operational mode, the active valve 2 is switched such that the compressed refrigerant vapor is led from the port 8 to the port 26 and flows over the exterior heat exchanger 23, the interior heat exchanger 19b to the expansion element 21.

The expansion elements 21 in all diagrams are designed as expansion elements that can be passed in both directions, or regarded as combination of two expansion elements that can be passed in one direction.

After the expansion of the refrigerant, it is vaporized in the interior heat exchanger 20 and the circuit is closed through the flow path of the passive valve 1 from port 25 to port 9 and the collector 19a, the interior heat exchanger 19b in direction of the compressor 18. The flow path in the passive valve 1 is switched by the high pressure at the port 24.

Highly advantageously, the invention combines the benefits of a compact design with alternating functional influence of the active and passive valves. The separation according to the invention of the active and passive valves makes possible to even better use of the limited space in motor vehicles.

The foregoing discussion discloses and describes preferred embodiments of the invention. One skilled in the art will readily recognize from such discussion, and from the accompanying drawings and claims, that changes and modifications can be made to the invention without departing from the true spirit and fair scope of the invention as defined in the following claims. The invention has been described in an illustrative manner, and it is to be understood that the terminology that has been used is intended to be in the nature of words and description rather than of limitation.

What is claimed is:

1. A valve assembly for a fluid circuit with two pressure levels for use in a combined cooling plant/heat pump circuit, the valve assembly comprising: a passive valve and an active valve, the active valve being provided with an actuator adapted to actively influence a control position of a closing body to regulate the fluid flow at high pressure, with the passive valve regulating the fluid flow at low pressure; wherein the active valve and the passive valve are constructively separated components designed as 3/2 directional valves such that the pressure difference between the high and the low fluid pressure and the control position of the active valve determines the control position of the passive valve.

2. The valve assembly in claim 1 wherein the passive valve has two control positions depending on the control position of the active valve and the passive valve further has a rest position for balanced pressure difference.

3. The valve assembly in claim 1 wherein the passive valve has two closing bodies connected with each other by a valve stem and, further, each closing body is connected to a spring element, by which the closing bodies take a central rest position for balanced pressure difference.

4. The valve assembly in claim 3 wherein sealing surfaces of the closing bodies of the passive valve face each other.

5. The valve assembly in claim 1 wherein the closing body of the active valve is provided with a valve stem on either side of the closing body, one side of the valve stem being connected to a spring element which holds the closing body in a first control position and another side of the valve stem being connected to a solenoid control, which when activated moves the closing body against the spring force of the spring element into a second control position.

6. A valve assembly for a fluid circuit with two pressure levels for use in a combined cooling plant/beat pump circuit, the valve assembly comprising: a passive valve and an active valve, the active valve being provided with a spring element and a solenoid control adapted to actively influence a control position of a closing body to regulate the fluid flow at high pressure, with the passive valve regulating the fluid flow at low pressure; wherein the active valve and the passive valve are constructively separated components designed as 3/2 directional valves such that the pressure difference between the high and the low fluid pressure and the control position of the active valve determines the control position of the passive valve and where the spring element holds the closing body in a first control position and activation of the solenoid moves the closing body against the spring force of the spring element into a second control position and where the spring element is dimensioned such that after deactivation of the solenoid control the closing body of the active valve is held in the second control position due to the pressure difference of the fluid flows.

7. The valve assembly in claim 1 wherein the closing body of the active valve is provided with sealing surfaces arranged on the closing body opposing from each other.

8. The valve assembly in claim 1 wherein the valve assembly has at least four ports and enables two flow paths in each control position.

9. The valve assembly in claim 1 wherein the active valve and the passive valve are thermally separated from each other by an insulating layer.

10. The valve assembly in claim 1 wherein the active valve and the passive valve are thermally separated from each other by a recess.

11. The valve assembly in claim 3 wherein the spring elements are adaptable to different fluid pressure differences.

12. A valve assembly for a fluid circuit with two pressure levels, suitable for use in a combined cooling plant/heat pump circuit, the valve assembly comprising: a passive valve and an active valve, the active valve being provided with an actuator adapted to actively influence a control position of a closing body and to regulate the fluid flow at high pressure, the passive valve regulating the fluid flow at low pressure, such that the pressure difference between the high and the low fluid pressure and the control position of the active valve determines the control position of the passive valve, wherein the valve assembly has five ports and each control position enables two flow paths through the five ports.

13. The valve assembly in claim 12 wherein the passive valve has two control positions depending on the control position of the active valve and the passive valve further has a rest position for balanced pressure difference.

14. The valve assembly in claim 12 wherein the passive valve has two closing bodies connected with each other by a valve stem and, further, each closing body is connected to a spring element, by which the closing bodies take a central rest position for balanced pressure difference.

15. The valve assembly in claim 14 wherein sealing surfaces of the closing bodies of the passive valve face each other.

16. The valve assembly in claim 12 wherein the dosing body of the active valve is provided with a valve stem on either side of the dosing body, one side of the valve stem being connected to a spring element which holds the closing body in a first control position and another side of the valve stem being connected to a solenoid control, which when activated moves the closing body against the spring force of the spring element into a second control position.

17. The valve assembly in claim 16 wherein the spring element is dimensioned such that the closing body of the active valve after activation of the solenoid control is held in the second control position also after switch-off of the solenoid control due to the pressure difference of the fluid flows.

18. The valve assembly in claim 12 wherein the closing body of the active valve is provided with sealing surfaces arranged on the closing body opposing from each other.

19. The valve assembly in claim 12 wherein the valve assembly has at least four ports and enables two flow paths in each control position.

20. The valve assembly in claim 12 wherein the active valve and the passive valve are separate components designed as 3/2-directional valves.

21. The valve assembly in claim 12 wherein the active valve and the passive valve are thermally separated from each other by an insulating layer.

22. The valve assembly in claim 12 wherein the active valve and the passive valve are thermally separated from each other by a recess.

23. The valve assembly in claim 14 wherein the spring elements are adaptable to different fluid pressure differences.

* * * * *